UNITED STATES PATENT OFFICE 2,437,966

INTERPOLYMER OF STYRENE AND FUMARODINITRILE PLASTICIZED WITH AN ALKYL PHTHALYL ALKYL GLYCOLLATE

David T. Mowry, Dayton, Ohio, assignor to Monsanto Chemical Company, St. Louis, Mo., a corporation of Delaware No Drawing. Application April 26, 1944,
Serial No. 532,871

3 Claims. (Cl. 260—36)

This invention relates to plastic compositions for use in the manufacture of films, lacquers, varnishes, molding compositions, etc., and it deals particularly with compositions comprising a copolymer of styrene with fumaronitrile (fumaric acid dinitrile) and a plasticizing agent.

An object of this invention is to produce compositions of matter which may be made into transparent, strong and flexible sheets or films of good heat and solvent-resistance. Another object of the invention is to produce compositions suitable for use in lacquers and other coating materials. Still another object of the invention is to produce compositions of matter which can be milled, rolled, extruded, molded or otherwise worked into sheets or molded objects having very good mechanical strength and a high degree of resistance to heat and solvents.

These and other objects which will be hereinafter disclosed are provided by the following invention wherein there are prepared compositions comprising styrene-fumaronitrile copolymers in admixture with alkyl phthalyl alkyl glycollates having the general formula:

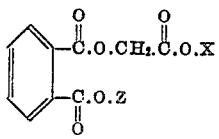

wherein X and Z stand for alkyl groups and particularly alkyl groups of from 1 to 4 carbon atoms. As illustrative of alkyl phthalyl alkyl glycollates having the above general formula may be mentioned methyl phthalyl methyl glycollate, methyl phthalyl ethyl glycollate, methyl phthalyl propyl glycollate, ethyl phthalyl ethyl glycollate, ethyl phthalyl methyl glycollate, ethyl phthalyl propyl glycollate, ethyl phthalyl butyl glycollate, propyl phthalyl methyl glycollate, propyl phthalyl ethyl glycollate, propyl phthalyl propyl glycollate, propyl phthalyl butyl glycollate, butyl phthalyl ethyl glycollate, butyl phthalyl propyl glycollate, butyl phthalyl butyl glycollate, etc.

When alkyl phthalyl alkyl glycollates of the above general formula are incorporated with styrene-fumaronitrile copolymers in amounts of, say, from 5 parts to 40 or more parts of the glycollate per 100 parts of resin there are obtained compositions which may be molded under heat and pressure or cast from solution to give molded objects or films that are characterized by toughness and heat- and solvent-resistance.

Styrene-fumarodinitrile interpolymers are generally described in my copending application Serial No. 450,514, filed July 11, 1942, now abandoned, and in the copending application of Reid G. Fordyce, Serial No. 503,941, filed September 27, 1943, now abandoned, both of these applications being assigned to the same assignee as is the present invention. The interpolymers may be obtained by polymerizing mixtures of styrene and fumarodinitrile by any of the known polymerizing procedures, in the presence or absence of a catalyst of polymerization. The interpolymers may be prepared to contain from 2.5% to 35% or 40% by weight of copolymerized fumaronitrile. In monomeric mixtures containing less than 30% by weight of fumaronitrile, under certain conditions the nitrile polymerizes more rapidly than does the styrene. Hence, in order to obtain uniform products a constant ratio of styrene to fumaronitrile should be maintained in the reaction mixture during the polymerization. Also, when working with monomer mixtures containing less than 30% by weight of fumaronitrile, the fumaronitrile content of the copolymer is always greater than that of the monomeric mixture. For example, a monomeric mixture consisting of 95% by weight of styrene and 5% by weight of fumaronitrile yields an interpolymer having a fumaronitrile content of about 19.5%. As the fumaronitrile content of the monomer mixture approaches 30%, however, the difference between the fumaronitrile content of the monomer and that of the copolymer becomes increasingly less; so that with a monomeric mixture consisting of 75% by weight of styrene and 25% by weight of fumaronitrile, there is obtained a copolymer having a fumaronitrile content of about 28.6%. Hence, in the following when styrene-fumaronitrile copolymers are stated to have a certain weight per cent of fumaronitrile, it should be understood that such a fumaronitrile content refers to that actually present as copolymerized fumaronitrile in the interpolymers and not to that originally present in the monomeric mixture employed for the preparation of the copolymers.

Fumaronitrile not only copolymerizes with vinyl aromatic compounds to form interpolymers of higher heat distortion points than the polyvinyl aromatic compound itself, but it is relatively selective in its polymerizing properties because it does not itself polymerize, nor does it form copolymers with some of the highly reactive aliphatic vinyl compounds such as vinyl chloride, vinyl acetate, methyl acrylate or methyl methacrylate.

Styrene-fumaronitrile copolymers differ essentially from polystyrene in that they have greater mechanical strength and a higher degree of thermal stability and resistance to solvents than does polystyrene. While the properties of the individual copolymers vary somewhat with the fumaronitrile content thereof, the difference between the copolymers and polystyrene is pronounced even when the fumaronitrile content of the copolymers is as low as, say, 5% by weight of the total weight of the copolymer. As the fumaronitrile content increases to, say, 30% of the total weight of the copolymer, the heat stability thereof becomes increasingly greater; so that for copolymers having a fumaronitrile content of, say, from 25% to 30% by weight injection molding is difficult and molded objects of such copolymers are preferably obtained by compression molding procedures under conditions of high heat and pressure. However, the very good mechanical strength of such copolymers, coupled with their great heat-stability and very good solvent-resistance, is such as to make these copolymers of great interest, so that they may be advantageously employed in the arts when compounded with the glycollate plasticizers herein disclosed.

Alkyl phthalyl alkyl glycollates in which the alkyl groups contain from 1 to 4 carbon atoms are particularly good plasticizers for styrene-fumaronitrile copolymers. These plasticizers are compatible with the copolymers in all proportions and do not evaporate from even very thin films thereof. Because both the copolymers and the glycollates are insoluble in gasoline, they make an excellent combination for producing gasoline resistant molded objects or surface coatings. Large amounts, i. e., amounts of from 30% to 60% or even 70% of the glycollates may be incorporated with styrene-fumaronitrile copolymers to obtain products whose heat-distortion points are substantially greater than those of many known unplasticized thermoplastics. Incorporation of the glycollates into the copolymers has substantially no effect on the very good solvent resisting properties of the copolymers alone.

The ready plasticization of the styrene-fumaronitrile copolymers with the glycollates is surprising for neither the glycollates nor other known plasticizing agents can be incorporated into polystyrene in sufficient amounts to give elongations higher than about 5% without reducing the tensile strength so greatly that the ultimate plasticized materials are of little, if any, value to either the plastics or the coatings industry. On the other hand, a styrene (74%)-fumaronitrile (26%) copolymer can be incorporated with 66% of its weight of a glycollate in order to give a formulation having an elongation of 45% and a tensile strength of approximately 4,000 p. s. i. The presence of the polar cyano groups in the macrochain of the copolymer appears to facilitate plasticization.

The glycollates may be added to the copolymer by simple mechanical mixing, kneading or milling or by solution in a mutual solvent. Plasticized styrene-fumaronitrile copolymers may also be obtained by polymerizing a mixture of styrene and fumaronitrile in the presence of one or more of the glycollates or by adding the glycollates to the reaction mixture at any desired stage of the polymerization.

The invention is further illustrated, but not limited, by the following examples:

Example 1

A styrene (74%)-fumaronitrile (26%) copolymer was intimately mixed with the indicated proportions of methyl phthalyl ethyl glycollate and the mixture was dissolved in 5% weight concentration in a 1:1 (by volume) mixture of acetone and ethylene dichloride. The following data was obtained upon films 0.002" thick prepared by casting a solution in the solvent upon a glass plate and then evaporating the solvent:

| Wt. per cent of Plasticizer (based on total wt. of plasticizer and copolymer) | No. of M. I. T. Flexes | Tensile Strength, p. s. i. | Elongation, per cent |
|---|---|---|---|
| 35.0 | 1 | 4,800 | 10 |
| 37.5 | 75 |  | 15 |
| 40.0 | 450 | 3,900 | 45 |
| 42.5 | 800+ | 2,600 | 60 |

The above values for M. I. T. flexes were determined on an M. I. T. folding endurance tester, employing a load of 0.5 kg., substantially according to the procedure described in the American Society for Testing Materials designation D643-43. The above value for tensile strength was determined by employing a model J-2 Scott tester, and a film of the plasticized copolymer which was 2 inches wide and of the thickness indicated above. The distance between the jaws of the tester was 2.0".

The cast films are clear and substantially colorless. They have a heat distortion point (ASTM) of from 60° C. to 70° C., depending upon the plasticizing content employed and may be advantageously employed as electrical insulating agents, for example, by winding the same on wires, cables, etc.

Example 2

This example shows the use of butyl phthalyl butyl glycollate instead of the methyl phthalyl ethyl glycollate of Example 1. The styrene-fumaronitrile copolymer was that used in Example 1 and the mixture with the glycollate was dissolved in 5% weight concentration in the solvent of Example 1. Evaluation of the 0.002" thick films which were cast from the solution gave the following data with the range of plasticizer concentrations given below:

| Wt. per cent of Plasticizer (based on total wt. of plasticizer and copolymer) | No. of M. I. T. Flexes | Tensile Strength, p. s. i. | Elongation, per cent |
|---|---|---|---|
| 35.0 | 370 | 3,600 | 35 |
| 37.5 | 425 | 3,500 | 50 |
| 40.0 | 1,500 | 2,000 | 60 |

This example shows that for applications where flexibility is more important than tensile strength, butyl phthalyl butyl glycollate is somewhat more preferable to methyl phthalyl ethyl glycollate.

Example 3

A styrene (70%)-fumaronitrile (30%) copolymer was prepared by mass polymerization of a mixture consisting of 70 parts by weight of styrene and 30 parts by weight of fumaronitrile, the polymerization being carried out by heating for 5 days at a temperature of 80° C. and then for one day at a temperature of 120° C. The resulting copolymer was milled upon rolls employing a front roll temperature of 315° F. and a back roll temperature of 230° F. for 10 minutes. 13 parts by weight of butyl phthalyl butyl glycollate was then incorporated with 87 parts by weight of the polymer by milling and molded test specimens were prepared from the plastic composition. Evaluation of the molded product gave the following values:

| | |
|---|---|
| Tensile strength, p. s. i. | 7,300 |
| Flexural strength, p. s. i. | 16,800 |
| Impact strength (arbitrary units) | 12 |
| Softening point, °C. | 150 |
| Melting point, °C. | 250 |

The above values compare very favorably with those obtained by similar testing procedures for unplasticized polystyrene. Depending upon the commercial type of polystyrene tested, these values usually range as follows:

| | |
|---|---|
| Tensile strength, p. s. i. | 6,000–6,500 |
| Flexural strength, p. s. i. | 10,000–11,000 |
| Impact strength (arbitrary units) | 9–10 |
| Softening point, °C. | 90–100 |
| Melting point, °C. | 200–225 |

The values for the plasticized solvent resistant coplymer also compare very favorably with the unplasticized copolymer, the advantage in the use of the plasticizer being that of easier moldability.

The above values for tensile strength were determined by employing a model J-2 Scott tester and a test bar of copolymer measuring 0.08" x 0.5" x 2". The above value for flexural strength was determined by employing a test bar measuring 0.08" x 0.5" x 2.0" and a model J-2 Scott tester, which tester had been modified by a special support having curved edges with a radius of 0.0625" and spaced at a distance of 0.625", the test strip being laid flat on said support. Evaluation of the impact strength was made by employing a modification of the cantiliver beam (Izod) impact machine described in the American Society for Testing Materials, Book of Standards, 1941 supplement, volume III.

*Example 4*

80 parts by weight of a styrene (70%)-fumaronitrile (30%) copolymer was mixed with 20 parts by weight of methyl phthalyl ethyl glycollate and the resulting mixture was added to acetone so as to make up a 5% solution of the copolymer-plasticizer mixture. A 0.002" thick film which was cast from the solution was flexible, clear and colorless. It had a softening point of 155° C. and a melting point of over 270° C. and was substantially unaffected by the lower alcohols or gasoline.

*Example 5*

80 parts by weight of a styrene (75%)-fumaronitrile (25%) copolymer was mixed with 20 parts by weight of methyl phthalyl ethyl glycollate and the resulting mixture was added to a 1:1 (by volume) mixture of acetone and ethylene chloride so as to make up a 5% by weight solution of the copolymer-plasticizer mixture. A film was prepared by casting the solution upon a surface, evaporating the solvent and stripping the dried film. The film was then crushed and powdered and used as a molding compound in an injection molding process. When tested in a Tinius Olsen plastic flowmeter, there was obtained a flow of 2.54" at a temperature of 285° F. and a pressure of 1500 p. s. i., which value shows very good flow of the plasticized material. The unplasticized styrene (75%)-fumaronitrile (25%) copolymer shows little or no flow under these conditions.

Evaluation of the mechanical properties of a molded test specimen of the plasticized copolymer of this example gave the following values:

| | |
|---|---|
| Tensile strength, p. s. i. | 5,000 |
| Flexural strength, p. s. i. | 14,500 |
| Impact strength (arbitrary units) | Above 30 |

The above evaluations were made by the procedures described in Example 3.

The present plasticized copolymer is particularly valuable in that there is attained very high impact and flexural strengths without undue sacrifice of tensile strength. It is readily molded and the molded pieces are lustrous objects of good clarity and color.

*Example 6*

80 parts of a styrene (70%)-fumaronitrile (30%) copolymer was mixed intimately with 20 parts of butyl phthalyl butyl glycollate and the mixture was added to acetone in such a proportion as to make up a 5% by weight solution. When the resulting solution was used as a lacquer on wood there was obtained a glossy, flexible and adherent coating which was resistant to boiling water, and the lower aliphatic alcohols, and unhydrolyzed by dilute acids or bases and unaffected by gasoline.

Other alkyl phthalyl alkyl glycollates in which each of the alkyl groups contains from 1 to 4 carbon atoms may be similarly employed, with good results as plasticizers for styrene-fumaronitrile copolymers. While the above examples show only the effect of the glycollates on copolymers containing from 25% to 30% of fumaronitrile, these copolymers being those which are most benefited by the plasticizers, the glycollates may also be employed advantageously with other styrene-fumaronitrile copolymers. The glycollates are compatible with copolymers having a fumaronitrile content of from, say, 10% to 30%, as they impart flexibility to such copolymers without unduly lowering the tensile strength thereof.

In the preparation of films or coating compositions it is obvious that there may be employed as solvent for the mixture of copolymer and glycollate any material which is readily volatilizable and which is a solvent for both the resin and the plasticizer.

In preparing either molding compositions, films or coatings, there may be used with the copolymers and the plasticizers other adjuvants, for example, organic dyes or pigments, fillers, mold lubricants, etc., the salient feature of the present invention being the use of the alkyl phthalyl alkyl glycollates with styrene-fumaronitrile copolymers in the presence or absence of other plasticizers and/or adjuvants.

It is to be understood that the foregoing detailed description is given merely by way of illustration and that many variations may be made therein without departing from the spirit of the invention.

What I claim is:

1. A plastic composition comprising an interpolymer consisting of styrene and fumarodinitrile, said interpolymer containing between 10% and 30% by weight of copolymerized fumarodinitrile and an alkyl phthalyl alkyl glycollate compatible therewith.

2. A plastic composition comprising an interpolymer consisting of styrene and fumarodinitrile, said interpolymer containing between 10% and 30% by weight of copolymerized fumarodinitrile and methyl phthalyl ethyl glycollate as a plasticizer therein.

3. A plastic composition comprising an interpolymer of styrene and fumarodinitrile, said interpolymer containing between 10% and 30% by weight of copolymerized fumarodinitrile and butyl phthalyl butyl glycollate as a plasticizer therein.

DAVID T. MOWRY.

REFERENCES CITED

The following references are of record in the file of this patent:

UNITED STATES PATENTS

| Number | Name | Date |
|---|---|---|
| 2,073,938 | Kyrides | Mar. 16, 1937 |
| 2,331,263 | Britton et al. | Oct. 5, 1943 |

FOREIGN PATENTS

| Number | Country | Date |
|---|---|---|
| 814,093 | France | Mar. 8, 1937 |

OTHER REFERENCES

Plastics of Chicago "Plasticizers—Their Use and Limitations," article by L. F. Pinto, pages 24–29 and 104–107, January 1945.